United States Patent [19]

Mugnaini

[11] 4,008,785

[45] Feb. 22, 1977

[54] TRANSPORT DEVICE FOR MOVEMENT OF AN OPERATOR UP AND DOWN A UTILITY POLE

[76] Inventor: Fernando Mugnaini, Via Gramsci 73, Colle Val D'Elsa, Siena, Italy

[22] Filed: Mar. 5, 1976

[21] Appl. No.: 664,413

[52] U.S. Cl. .............................. 182/133; 182/187
[51] Int. Cl.² .......................................... A63B 27/00
[58] Field of Search .......... 182/133, 134, 141, 148, 182/187, 188; 187/2, 6, 9 R

[56] References Cited

UNITED STATES PATENTS

| | | | |
|---|---|---|---|
| 742,447 | 10/1903 | Kidder | 182/133 |
| 957,473 | 5/1910 | Olafson | 182/133 |
| 2,174,525 | 10/1939 | Padernal | 182/133 |
| 2,654,638 | 10/1953 | Elliott | 182/133 |
| 2,727,335 | 12/1955 | Susil | 182/133 |
| 3,520,383 | 7/1970 | Loock | 182/133 |

*Primary Examiner*—Reinaldo P. Machado

[57] ABSTRACT

A device to facilitate the movement of an operator along a supporting pole for electric lines and the like including a frame forming a footboard for the operator, a side supporting roller, two linkages each comprising a pair of "X" linked rods, whose intermediate pivot is slidable on the frame, and a pair of symmetrical rods engaged with a pin fixed to the frame. A pair of drive rollers is mounted at the ends of the two linkages, and the weight of the assembly and of the operator acts on the frame to urge the drive rollers towards each other and against the pole.

11 Claims, 12 Drawing Figures

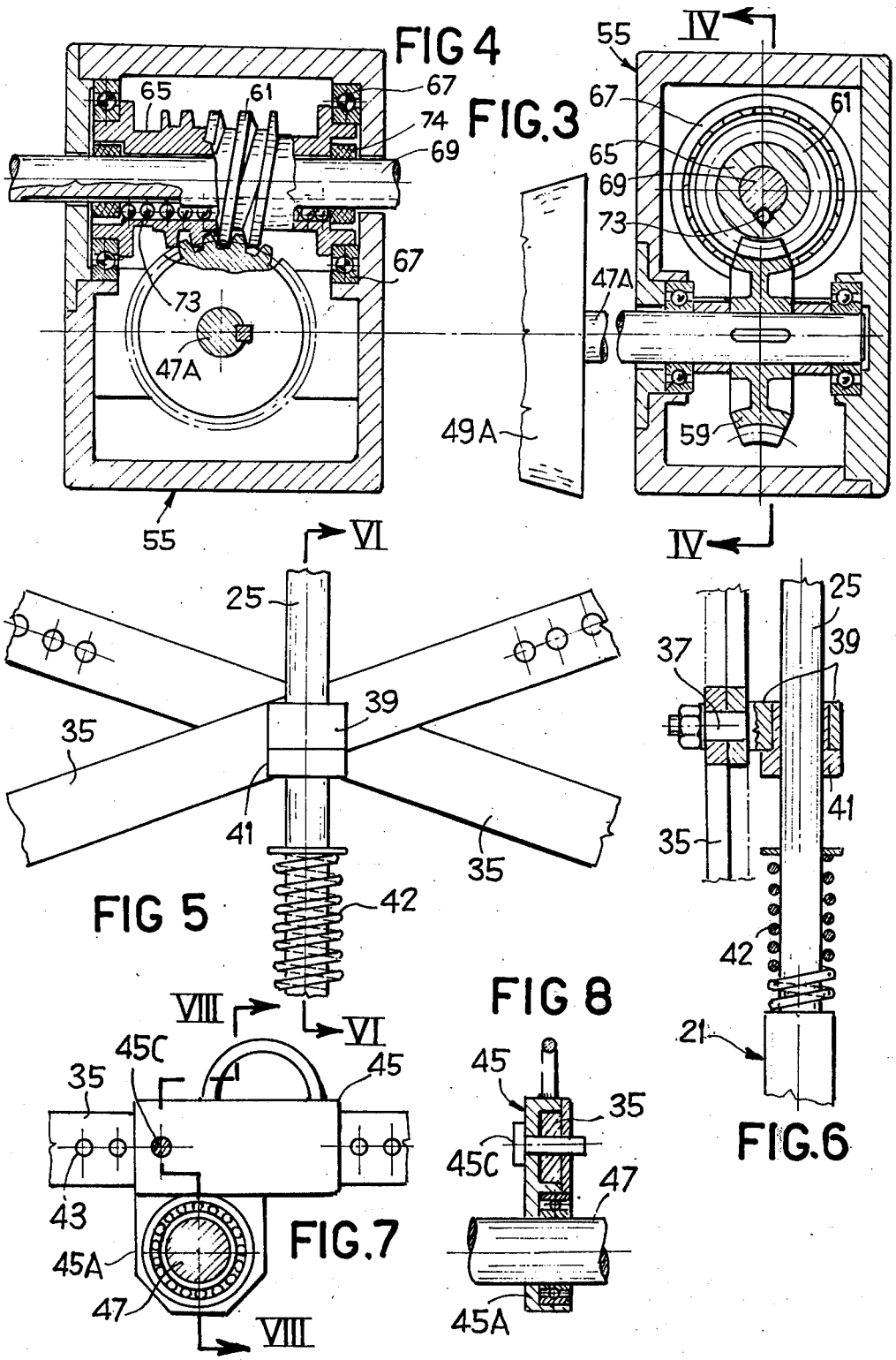

TRANSPORT DEVICE FOR MOVEMENT OF AN OPERATOR UP AND DOWN A UTILITY POLE

FIELD OF THE INVENTION

The invention relates to a device to facilitate the movement of an operator along a utility pole for support of electric lines and the like.

SUMMARY OF THE INVENTION

In accordance with the invention such device comprises: a square frame forming a footboard for the operator and two stems which form stabilizing rods adapted to flank the pole; a side supporting contrast roller carried by said frame; two linkages arranged on both sides of the frame, each including a pair of X linked rods having an intermediate pivot slidable on the respective stem and another pair of symmetrical rods engaged on a pin fixed to the stem; a pair of drive rollers having parallel axes, supported at the ends of said two linkages, in such a manner that the weight of the device and the operator acting on the footboard urges the drive rollers toward each other and against the pole with pressure and operating means acting on the drive rollers through a drive to provide relative movement between said rollers and the pole.

The drive may include a shaft substantially perpendicular to the axes of both drive rollers, two worm wheel couplings between said shaft and both rollers, one of said couplings including a worm wheel slidably fitted on said shaft, and hand or motor driven operating means for said shaft.

Both pairs of X linked rods are advantageously adjustable by means of a plurality of holes longitudinally arranged on the rods for engagement thereof by sliders carrying the drive roller shafts.

The frame having the stems and the supporting and contrasting roller is made in such a way that an elastic yielding is obtained therebetween, the stems forming then flexure rods and/or the bearings of the supporting and contrasting roller being yieldable. The X linked rods may be adjustably engaged with the bearings for the drive rollers or with drive casings from the coupling between the worm and the worm wheel drive shaft. The sliding pivot of each pair of X linked rods may be supported by a sleeve which is slidable along the respective stem forming a stabilizing rod for the frame.

These and other features and consequent advantages will result from the following description.

BRIEF DESCRIPTION OF THE DRAWING

The invention will be better understood from the following description given with reference to the accompanying drawing which illustrates a non-restrictive embodiment of the invention.

In the drawing:

FIGS. 3 and 4 illustrate an enlarged cross-section respectively taken along line III—III in FIG. 2 and along line IV—IV in FIG. 3;

FIGS. 5 and 6 illustrate respectively an enlarged detail of FIG. 1 and a local section taken along line VI—VI in FIG. 5;

FIGS. 7 and 8 illustrate respectively a detail of a binding means and a view in section taken substantially along the broken line VIII—VIII in FIG. 7;

DETAILED DESCRIPTION

Figure 1:
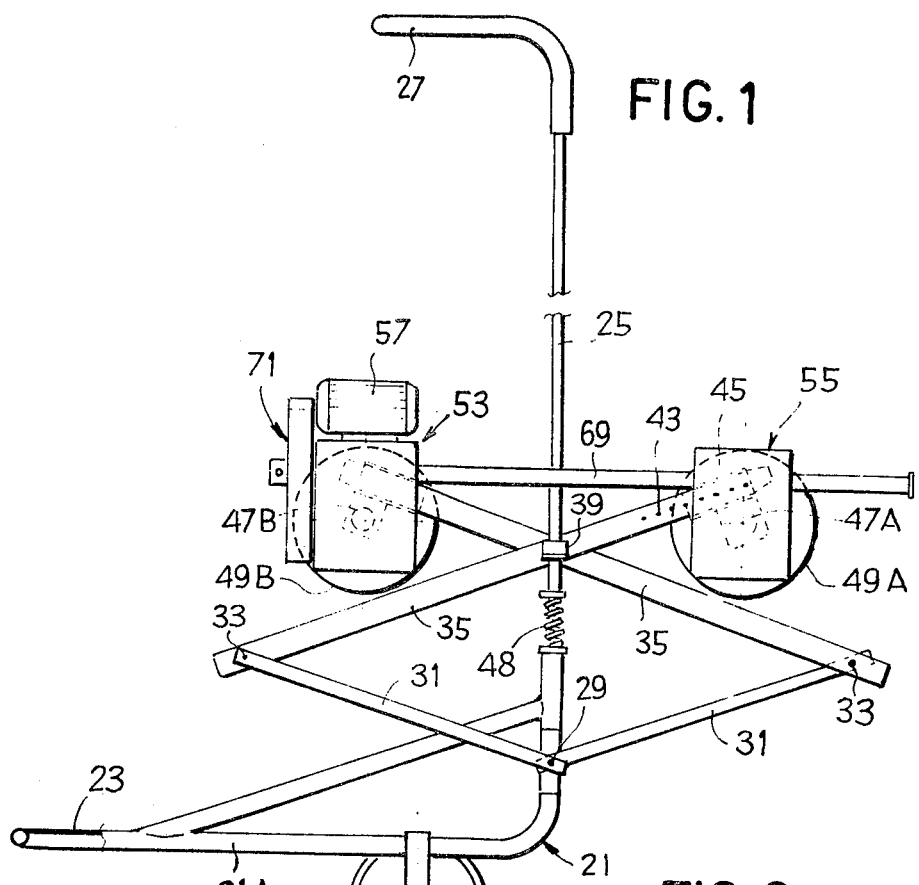
FIG. 1 illustrates a side view of the device in the inactive position.
Figure 2:
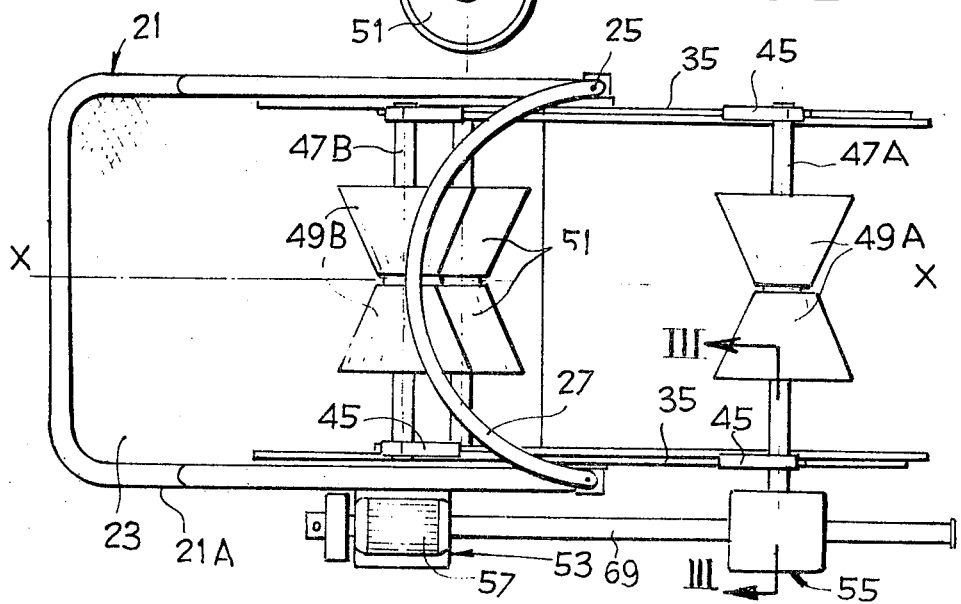
FIG. 2 is a plan view thereof.

In the accompanying drawing, numeral 21 indicates a square frame which has a portion 21A cooperating with member 23 to form a footboard for the operator. The frame 21 also includes two stems or rods 25, which by virtue of material and sizing are slightly flexible and form flexure and stabilizing rods for the purposes and functions to be hereinafter given. Attached to the upper ends of both stems or rods 25 are the two ends of an arcuate grip 27 which follows the contour of the pole, as will become clear hereinafter, said grip serving particularly for the fastening of a safety belt as evident in FIG. 9. Two tie rods 31 are pivotably connected to the frame 21 at each of two pins 29 below the fitting points of the rods 25 to said frame. These two tie rods 31, pivoted at 29 on each side of the frame 21 in correspondence with each of both flexible stems 25, are connected at their ends at pins 33 to two respective rods 35, which cross in correspondence with the respective stem 25 and extend therebeyond. In correspondence with the crossing points, the two rods 35 are pivotably connected to each other (FIG. 6) by means of a pin 37 which is borne by an eyelet member 39 provided with a sliding bush 41, by means of which the eyelet member 39 is slidable on the respective stem 25. Springs 42 are mounted on stems 25 to serve as dampening stops for the units composed of eyelet members 39 and bush 41. At the ends opposite to the pins 33, each of the rods 35, which has a flat rectangular section, is provided with a series of holes 43. A slider 45 can be engaged in a selected hole, said slider being slidable along the respective rod 35 and adjustably engageable in a hole depending on the size of the pole with which the truck is to cooperate. Two of such sliders 45, corresponding to one another on the ends of both sets of rods 35 on opposite sides of a vertical longitudinal plane of symmetry (denoted by X—X as shown in FIG. 2), engage by means of projections 45A a corresponding shaft 47 carrying a double frusto-conical roller with the smaller bases facing one another. By virtue of the two pairs of rods 35 on opposite sides of the plane of symmetry, two shafts designated by 47A and 47B and two double frusto-conical rollers 49A and 49B are provided. By adjusting the position of the sliders 45 on the rods 35, the distance between the rollers 49A and 49B can be adjusted.

Mounted on the frame 21 under the footboard portion 21A, is an additional double frusto-conical roller 51 whose axis is parallel to that of shafts 47A and 47B.

Both shafts 47A and 47B have one of their ends projecting beyond the supporting slider 45 at the corresponding end and entering into two respective casings 53 and 55. FIGS. 3 and 4 show in detailed manner one of the two casings 55, in which shaft 47A enters. Both casings 53 and 55 are substantially similar and only casing 55 is described, the latter differing from casing 53 which carries an electric motor 57 on its upper surface and presents a fixed key instead of a slidable one as will hereinafter be described. On the shaft 47A (and correspondingly also on the shaft 47B), a worm wheel 59 is mounted and meshes with a worm screw 61 formed on a sleeve 65 borne by bearings 67 on casing 55. The sleeve 65 is mounted on a shaft 69, which passes through both casings 55 and 53 and the shaft 69 can slide with respect to the sleeve 65 in the casing 55, while it is engaged with a conventional key to the sleeve in the casing 53. In a general manner numeral 71 indicates a drive connection between the motor 57 and the shaft 69. The rotational coupling between the sleeve 65 and the shaft 69 slidable therein, is obtained by means of a key (not shown) or preferably by means of a series of balls 73 adapted to roll between opposite substantially triangular sides of longitudinal recesses or grooves in the sleeve and the shaft, which form a seat of substantially square section for the balls 73 (FIG. 3). In this way, although in the presence of substantial reaction thrusts, one obtains a substantially high sliding capability of the shaft 69 with respect to the sleeve 65. The balls 73 are contained between two synthetic resin bushes 74 or the like.

By means of the above described arrangement, by operating the motor 57, power is transmitted through the drive connection 71, the shaft 69, the sleeves 65, the worm screws 61 and the worm wheels 59, to drive the two shafts 47A and 47B and accordingly the two drive rollers 49A, 49B, in opposite directions at the same speed to obtain movement of the truck along a pole P, due to the capability of variation of the center distance between the two shafts 47A, 47B, in relation to the dimension of the pole whereby the pair of rollers 49A and 49B instantaneously grip the pole.

The operation of the device is as follows.

The truck device is mounted on pole P such as a cement pole (FIG. 9), which is slightly conical, or on a metal or similar pole having steps. For mounting purposes, the sliders 45 of the shaft 47A are released from the rods 35 and the shaft 47A and the roller 49A are removed. They are reassembled after the device is arranged against the pole. In order to obtain this, there is provided a plug such as 45C (FIGS. 7 and 8), adapted to be easily connect and disconnect from the slider 45.

Figure 9:
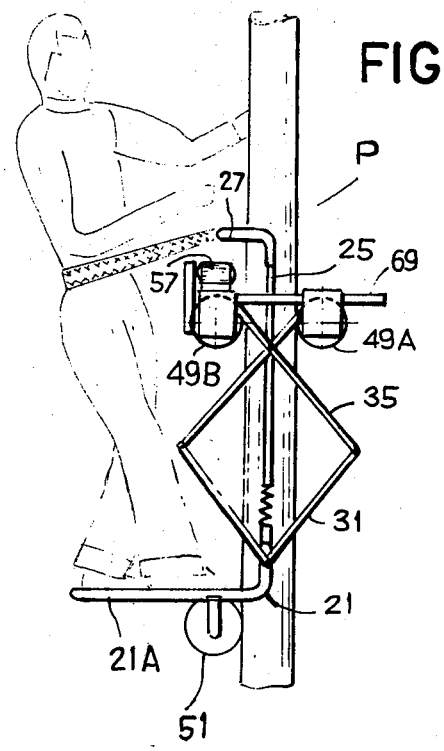
FIG. 9 illustrates the truck operating on a pole.
Figure 10:
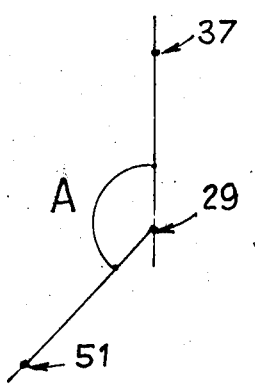
FIG. 10 is an explanatory diagram of the operational manner of the device.

When the device is located on the pole and the roller 49A is reassembled, the rollers 49B and 51 are on one side of the pole, and the roller 49A is on the other side of the pole. The arrangement of the truck is shown in FIG. 9. By virtue of the linkages formed by the pivots 29, the sliding units 39, 41 and the rollers 49A, 49B mounted on the ends of the rods 35, the rollers 49A and 49B can be moved by the weight of the truck and of the operator (who can stand on the platform formed by the portion 21A of the frame 21) to clamp against the pole and thus engage the assembly to the pole, whatever the variation of section which the pole may assume along its length. The rollers 49A, 49B are automatically braked by the irreversible drive formed by the worm screw and the worm wheels, whereby only a control operated by hand or with the motor 57 (reversible) may allow movement of the truck along the pole both upwards and downwards. The roller 51 only serves for lateral engagement and stabilization of the frame 21. In the diagram in FIG. 10, by geometrical points the force components 37, 29 and 51 are indicated, the connection lines of which form an angle A. The flexibility of the stems 25 allows variation of the angle A within a suitable range to obtain a correct adherence and orientation effect of the truck along the pole, with variation of the section thereof.

The springs 42 dampen possible impact which may occur with the slacking of both rollers 49A, 49B, when the truck rests on the ground or when the member 39 tends to slide downwardly on the rods 25.

It is to be noted that the embodiment of the keys between the shaft 69 and the sleeves forming the worm screws, at least in the casing 55 which slides along the shaft 69, has been designed to allow a high sliding capacity during the drive of the pair with reaction pressures between both parts (shaft and sleeve) through the key. Making the keys in the form of balls as denoted at 73 allows a rolling movement instead of a sliding movement.

Figure 11:
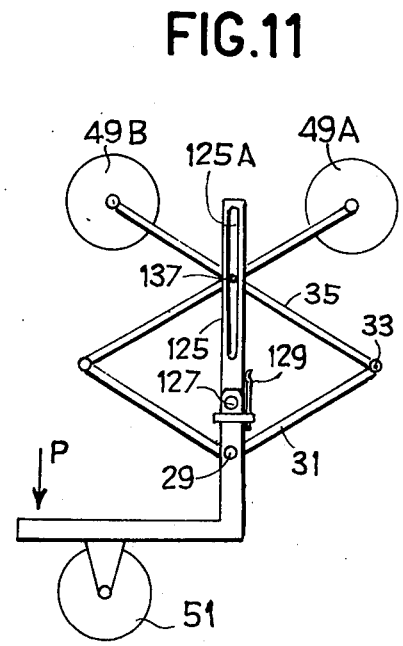
FIGS. 11 and 12 are diagrammatic side views of variants of the embodiment of the device.
Figure 12:
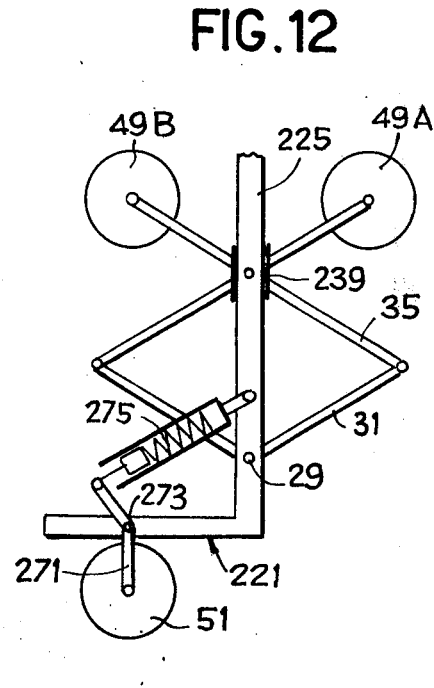

FIGS. 11 and 12 show schematic variations of the embodiment of FIGS. 1 to 9. These variants particularly relate to the possibilities of elastic yielding which in the previous embodiment has been obtained by the elastic stems 25. According to FIG. 11, where corresponding members are indicated by the same reference numerals, instead of the elastic stems 25 there are provided bars 125 pivoted at pins 127 to the frame 21 and stressed by elastic means 129 in a counterclockwise direction around the pins 127 and with respect to the frame 21. Each of the bars 125 has a slide slot 125A for a link pin 137 corresponding to pin 37 in the previous embodiment. In the embodiment of FIG. 12, a frame 221 corresponding to that denoted by 21 of the first embodiment includes rigid rods 225 integral thereto, and along which are slidable sleeves 239 corresponding to sleeves 39 and carrying the rods 35 pivotably connected thereto. The contact roller 51 instead of being rigidly supported by the frame 21 (with possible positional adjustment) is mounted on a unit 271 pivotable around pivot 273 on the frame 21. Unit 271 is biassed in the clockwise direction by elastic compression means 275 connected to the frame 221. In this way, the roller 51 can be urged with a determined thrust force against the pole.

What is claimed is:

1. A transport device for a operator along a supporting pole comprising
    a frame including a footboard for an operator and two upright stem members adapted to flank the pole, a support roller carried by said frame;
    two linkages on opposite sides of the frame each including a first pair of X linked rods having an intermediate pivot slidable along a respective stem and a second pair of symmetrical rods pivotably engaged with a fixed pin on such stem;
    a pair of drive rollers with parallel axes supported by said two linkages such that the weight of the device and of the operator on the footboard urges the drive rollers towards one another and engages them with pressure against the pole;
    and operating means acting on the drive rollers to provide relative movement between said rollers and the pole to move the device up and down the pole.

2. A device as claimed in claim 1, wherein said operating means includes a drive means comprising a shaft extending substantially perpendicular to the axes of both drive rollers, two worm wheel couplings between said shaft and the two rollers, one of said worm wheel couplings including a worm screw slidably fitted on said shaft, and means for driving said shaft in rotation.

3. A device as claimed in claim 2, wherein said means for driving said shaft in rotation comprises a drive motor.

4. A device as claimed in claim 1, wherein each of said drive rollers includes two frusto-conical bodies having their smaller bases facing one another.

5. A device as claimed in claim 1, wherein said first pair of X linked rods has a plurality of longitudinally aligned holes, sliders engageable in selected holes, and roller shafts mounted on said sliders and carrying the drive rollers.

6. A device as claimed in claim 1, wherein said upright members are stems constituting flexible stabilizing rods.

7. A device as claimed in claim 1, comprising support means supporting said support roller on said frame, and elastically yielding means between said support roller and said upright members.

8. A device as claimed in claim 7, wherein said elastically yielding means is constituted by stems yieldable in flexure forming part of said upright member.

9. A device as claimed in claim 7, wherein said elastically yielding means is constituted by elastically yielding support means for the support roller.

10. A device as claimed in claim 1, including adjustable supports at the ends of the X linked rods of said first pair of rods, said supports being coupled to said drive rollers.

11. A device as claimed in claim 1, comprising a sleeve supporting said intermediate pivot of each of said first pairs of X linked rods, said sleeve being mounted for sliding along a respective upright member.

* * * * *